(12) United States Patent
Chang

(10) Patent No.: US 6,552,823 B1
(45) Date of Patent: Apr. 22, 2003

(54) ENHANCED ERROR DIFFUSION BY USING PEAK POSITION PROFILES

(75) Inventor: Chingwei Chang, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/323,583

(22) Filed: Jun. 1, 1999

(51) Int. Cl.⁷ ............................................ H04N 1/40
(52) U.S. Cl. ............................. 358/3.03; 382/237
(58) Field of Search ..................... 358/1.9, 3–3.09; 382/237, 251–253

(56) References Cited

U.S. PATENT DOCUMENTS

| | | | |
|---|---|---|---|
| 3,997,719 A | * 12/1976 | Judice | 315/169.4 |
| 5,493,416 A | 2/1996 | Fan | 358/447 |
| 5,535,019 A | 7/1996 | Eschbach | 358/456 |
| 5,555,102 A | * 9/1996 | Dalton | 358/3.14 |
| 5,611,022 A | 3/1997 | Estrada et al. | 358/1.9 |
| 5,627,659 A | 5/1997 | Kakutani | 358/407 |
| 5,692,109 A | 11/1997 | Shu | 358/1.9 |
| 5,710,828 A | * 1/1998 | Hashimoto | 358/466 |
| 5,737,453 A | 4/1998 | Ostromoukhov | 382/275 |
| 5,739,917 A | 4/1998 | Shu et al. | 358/298 |
| 5,757,976 A | 5/1998 | Shu | 358/443 |
| 5,760,920 A | * 6/1998 | Lin et al. | 358/3.2 |
| 6,352,329 B1 | * 3/2002 | Watanabe et al. | 347/15 |

* cited by examiner

*Primary Examiner*—Thomas D. Lee
*Assistant Examiner*—Stephen Brinich
(74) *Attorney, Agent, or Firm*—Marger Johnson & McCollom, PC

(57) ABSTRACT

A method for enhanced error diffusion. The method includes the steps of selecting values for a first level of peak positions, placing these peak positions in selected positions of a matrix, creating a peak position profile. The peak position profiles are then used to adjust the error threshold by applying the peak position profile. The profiled error threshold is then used to calculate error for the current input pixel value and the resulting error is diffused to the neighbors of the current pixel.

8 Claims, 2 Drawing Sheets

ENHANCED ERROR DIFFUSION BY USING PEAK POSITION PROFILES

BACKGROUND OF THE INVENTION

1. Field of the Invention

This invention relates to error diffusion in printing, more particularly to enhanced error diffusion for high-speed printing.

2. Background of the Invention

In digital printing, the output to the printing system that forms the necessary dots is binary, either ON or OFF. A comparison of the intended value to a threshold determines whether the output is ON or OFF. For example, consider an 8-bit system with a range of possible values from 0–255. The threshold for ON or OFF is set to 127.5, or at the mid-point. Values above will be turned ON, values below OFF.

However, the value given an ON dot will be 255, and OFF will be 0. Therefore, an error exists between the intended value and the printed value of the dot. For example, if a dot has an intended value of 200, it lies above the threshold and will be turned ON. Its printed value will be 255, so there is an error of 55 between its intended and printed values.

This error is typically handled with error diffusion, originally proposed by Floyd and Steinberg. The error value can be assigned to the neighbor dots, since the dots are so relatively small in the perceived human eye response; the eye will tend to integrate that dot and its neighboring dots into one larger spot of color. Floyd and Steinberg suggested using four yet to be processed pixels that neighbor the pixel with the error value.

The Floyd-Steinberg approach 10 is shown in FIG. 1. The threshold is applied to the input color value, which in this example is 200. The threshold is 128, so that dot is printed. The resulting difference between the intended value of 200 and the printed value is 55. It will be diffused to the neighbors with the weights of 7 5 3 1, in the positions shown at 14. The sum of the weights is 16, so the error value ed=55/16=3.44. The following table demonstrates the result of error diffusion on the neighboring pixels. The original value for all pixels is 144.

| Error weight | Error Value | Resulting Error | Original-Error | Result |
| --- | --- | --- | --- | --- |
| 7 | 3.44 | 24 | 120 | 0 |
| 5 | 3.44 | 17 | 127 | 0 |
| 3 | 3.44 | 10 | 134 | 255 |
| 1 | 3.44 | 3 | 139 | 255 |

It must be understood that the error values computed for each pixel are only those from the previous pixel. Other error values exist for the pixels from other neighboring pixels. For example, if X in the below diagram is the pixel with value 200 from the example, Y is the neighboring pixel. The pixel that has the 5 weight from X is the pixel that has the 3 weight from Y. The error diffusion for X is in parentheses (), the error diffusion for Y in the brackets [].

| | | X | Y(7) | [7] |
| --- | --- | --- | --- | --- |
| X error diffusion() | (3) | (5)[3] | (1)[5] | [1] |

As mentioned above, the flowchart for this process is shown in FIG. 1. When this process is applied to color printing, it results in objectionable artifacts. One such artifact occurs in highlight areas. Dots of color group together in a wormlike form. These worms detract from the image quality. Other problems occur in low-density regions, where the low-density regions seem to trail off or 'melt' at the edges.

Several adjustments to the Floyd-Steinberg process have been suggested. Some adjust the weighting and position of the neighbors to which the error is diffused, as in U.S. Pat. No. 5,737,453, issued in 1998 to Ostromoukov. Others apply noise masks or other types of error filters to the thresholding value. Examples of these can be found in U.S. Pat. No. 5,611,022, issued in 1997 to Estrada, et al., and U.S. Pat. No. 5,757,976, issued 1998 to Shu. Several other examples of enhancements can be found.

All of these techniques generally provide enhancements to the error diffusion process, resulting in higher quality images than using just the Floyd-Steinberg error diffusion. However, these techniques add to the processing time necessary for each pixel of the image, slowing down the print process. Therefore, a method of enhancing the error diffusion process while balancing the need to minimize processing time is needed.

SUMMARY OF THE INVENTION

One aspect of the invention is a method for enhanced error diffusion for digital printing. The method includes the steps of selecting values for peak positions and placing those values in a matrix to be applied to the error threshold. The input image value is compared to a profiled threshold. The profiled threshold is the error threshold adjusted by the peak position value. The peak position values are determined to make it more likely that a dot will exceed the error threshold, resulting in the dot being turned on. This discharges any accumulated density in that area, avoiding artifacts such as worms and edge melting.

Another aspect of the invention is an automated process for placing the peak position values in the matrix. This process includes the steps of segmenting the matrix into squares, randomly offsetting the values from the center of the square and then using the offset positions of the values to seed the position for the next level of values.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1:
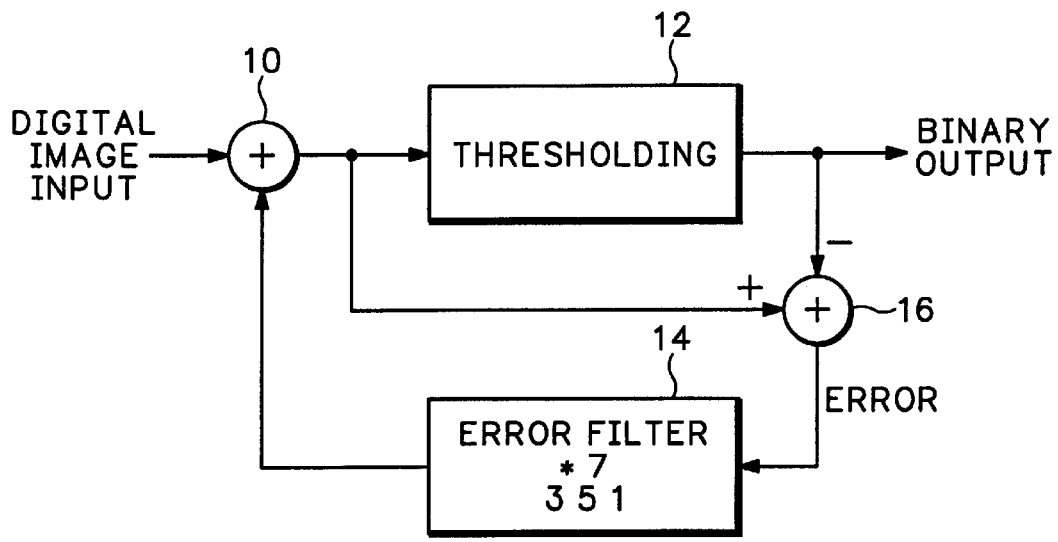
FIG. 1 is a flowchart of the Floyd-Steinberg error diffusion process.
Figure 2:
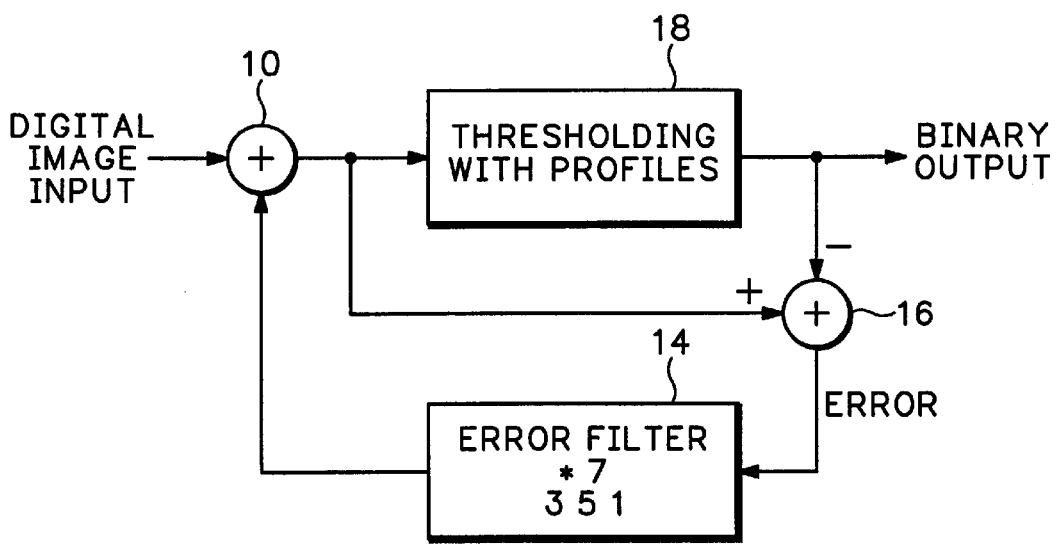
FIG. 2 is a flowchart of an enhanced error diffusion process in accordance with the invention.

FIG. 1 shows the prior art Floyd-Steinberg error filter as previously discussed. Referring now to FIG. 2, the difference between the two can be seen in the application of the thresholds in block 18. In FIG. 1, block 12 the standard threshold was applied. In FIG. 2, block 18, the threshold is applied but with a profile.

A profile in this case means a peak position profile. A peak position profile is actually a matrix of pre-determined values that are used to adjust the threshold value. The pre-determined values are placed in selected positions of the matrix, with the remaining values of the matrix being zero. The non-zero values in the matrix, which are the peak positions, are subtracted from the threshold value. One difference between this type of matrix and other approaches such as blue noise masks is that most of the values in the matrix are zero. Additionally, it is not a dither matrix, since dither matrices include all the is available gray levels.

By occasionally lowering the threshold value, the priority for turning on that dot is raised. Essentially, this embodiment of the invention forces a dot to turn on, which reduces the likelihood that neighboring pixels will be turned on. In addition to controlling the lowering of the threshold value by applying the peak position profile, the overall threshold is raised. This decreases the likelihood that other dots will turn on. This avoids the grouping of dots into worms. The grouping of dots at the edges in the highlight areas causes edge melting, so the avoidance of these groupings also avoids edge-melting artifacts.

The placement of the peak profiles can be done by hand, or automatically. For example, each color layer has a 16 by 16 matrix. Within that matrix, 16 peak positions are selected for each color. The matrix can then be tiled across the image. Manual selection of the matrix allows the designer to avoid tiling problems by inspection of the tiling results. Adjustments can be made to the peak position profiles for the 16 by 16 matrix. Examples are shown below.

CYAN

```
 0  0    0  0   0  0    0    0   0  0    0    0   0  0    0    0
 0  0   48  0   0  0    0    0   0  0  156    0   0  0    0    0
 0  0    0  0   0  0    0    0   0  0    0    0   0  0    0    0
 0  0    0  0   0  0   96    0   0  0    0    0   0  0  108    0
 0  0    0  0   0  0    0    0   0  0    0    0   0  0    0    0
 0  0  168  0   0  0    0    0   0  0   36    0   0  0    0    0
 0  0    0  0   0  0    0    0   0  0    0    0   0  0    0    0
 0  0    0  0   0  0  132    0   0  0    0    0   0  0   84    0
 0  0    0  0   0  0    0    0   0  0    0    0   0  0    0    0
 0  0   12  0   0  0    0    0   0  0  192    0   0  0    0    0
 0  0    0  0   0  0    0    0   0  0    0    0   0  0    0    0
 0  0    0  0   0  0   60    0   0  0    0    0   0  0  144    0
 0  0    0  0   0  0    0    0   0  0    0    0   0  0    0    0
 0  0  180  0   0  0    0    0   0  0   24    0   0  0    0    0
 0  0    0  0   0  0    0    0   0  0    0    0   0  0    0    0
 0  0    0  0   0  0  120    0   0  0    0    0   0  0   72    0
```

MAGENTA

```
  0  0  0  0    0  0  0    0    0  0  0  0    0  0  0  0
  0  0  0  0   84  0  0    0    0  0  0  0   12  0  0  0
  0  0  0  0    0  0  0    0    0  0  0  0    0  0  0  0
156  0  0  0    0  0  0    0   72  0  0  0    0  0  0  0
  0  0  0  0    0  0  0    0    0  0  0  0    0  0  0  0
  0  0  0  0  108  0  0    0    0  0  0  0   96  0  0  0
  0  0  0  0    0  0  0    0    0  0  0  0    0  0  0  0
 36  0  0  0    0  0  0    0  180  0  0  0    0  0  0  0
  0  0  0  0    0  0  0    0    0  0  0  0    0  0  0  0
  0  0  0  0  144  0  0    0    0  0  0  0   60  0  0  0
  0  0  0  0    0  0  0    0    0  0  0  0    0  0  0  0
192  0  0  0    0  0  0    0  120  0  0  0    0  0  0  0
  0  0  0  0    0  0  0    0    0  0  0  0    0  0  0  0
  0  0  0  0   48  0  0    0    0  0  0  0  132  0  0  0
  0  0  0  0    0  0  0    0    0  0  0  0    0  0  0  0
 96  0  0  0    0  0  0    0  168  0  0  0    0  0  0  0
```

YELLOW

```
0  0  0    0   0  0  0    0   0  0  0    0   0  0  0    0
0  0  0    0   0  0  0  144   0  0  0    0   0  0  0   72
0  0  0    0   0  0  0    0   0  0  0    0   0  0  0    0
0  0  0  192   0  0  0    0   0  0  0   48   0  0  0    0
0  0  0    0   0  0  0    0   0  0  0    0   0  0  0    0
0  0  0    0   0  0  0   96   0  0  0    0   0  0  0  120
0  0  0    0   0  0  0    0   0  0  0    0   0  0  0    0
0  0  0   24   0  0  0    0   0  0  0  156   0  0  0    0
0  0  0    0   0  0  0    0   0  0  0    0   0  0  0    0
0  0  0    0   0  0  0   68   0  0  0    0   0  0  0   12
0  0  0    0   0  0  0    0   0  0  0    0   0  0  0    0
0  0  0  168   0  0  0    0   0  0  0   84   0  0  0    0
0  0  0    0   0  0  0    0   0  0  0    0   0  0  0    0
0  0  0    0   0  0  0   36   0  0  0    0   0  0  0  132
0  0  0    0   0  0  0    0   0  0  0    0   0  0  0    0
0  0  0   60   0  0  0    0   0  0  0  180   0  0  0    0
```

BLACK

```
0  0    0  0  0  0  0  0  0  0   0  0  0  0  0  0
0  0  156  0  0  0  0  0  0  0  48  0  0  0  0  0
0  0    0  0  0  0  0  0  0  0   0  0  0  0  0  0
```

-continued

| | | | | | | | | | | | | | | | |
|---|---|---|---|---|---|---|---|---|---|---|---|---|---|---|---|
| 0 | 0 | 0 | 0 | 0 | 0 | 108 | 0 | 0 | 0 | 0 | 0 | 0 | 0 | 96 | 0 |
| 0 | 0 | 0 | 0 | 0 | 0 | 0 | 0 | 0 | 0 | 0 | 0 | 0 | 0 | 0 | 0 |
| 0 | 0 | 36 | 0 | 0 | 0 | 0 | 0 | 0 | 0 | 168 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 72 | 0 | 0 | 0 | 0 | 0 | 0 | 0 | 120 | 0 |
| 0 | 0 | 0 | 0 | 0 | 0 | 0 | 0 | 0 | 0 | 0 | 0 | 0 | 0 | 0 | 0 |
| 0 | 0 | 192 | 0 | 0 | 0 | 0 | 0 | 0 | 0 | 12 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 144 | 0 | 0 | 0 | 0 | 0 | 0 | 0 | 60 | 0 |
| 0 | 0 | 0 | 0 | 0 | 0 | 0 | 0 | 0 | 0 | 0 | 0 | 0 | 0 | 0 | 0 |
| 0 | 0 | 24 | 0 | 0 | 0 | 0 | 0 | 0 | 0 | 18 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 84 | 0 | 0 | 0 | 0 | 0 | 0 | 0 | 132 | 0 |

These matrices are only intended as examples of manually selected peak position profiles. They are in no way intended to limit application of the invention. The application of these matrices, or of those selected automatically, which will be discussed in more detail below, can be performed in several ways.

Figure 3:
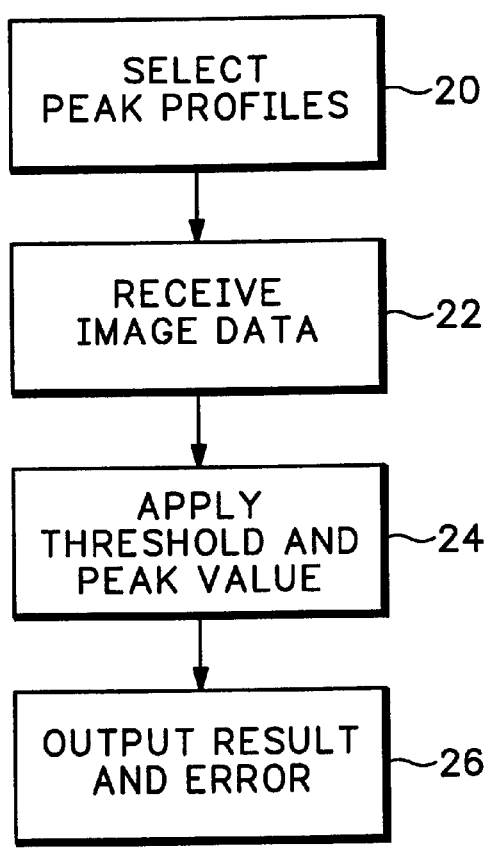
FIG. 3 is a flowchart of a method of enhanced error diffusion in accordance with the invention.

One method of applying matrices such as these is shown in FIG. 3. At step 20, the actual matrices to be used are selected. For discussion purposes, the matrices selected above will be used, specifically the black matrix.

The image data is received at step 22. The image data will be assumed to be of value 135 and for the third pixel position of the second row of that tile. The value from the BLACK matrix above is 156. Without applying the peak position profile, the threshold is assumed to be 195. Therefore, with no profiling, the dot would not be turned on.

However, by subtracting the peak position profile from the threshold by the following formula:

Profiled threshold=Threshold−Peak;

the profiled threshold equals 195−156=39. This would result in the dot being turned on with the input value at 135.

The output result and error for step 26 would then be an ON pixel for a value of 255, and an error of 220 (255−135). This error value would then be passed to the neighboring pixels. Its high value will result in fewer neighboring pixels turning ON. In this manner, the cumulated density for that area will be controlled to be at the designated peak position and will avoid many neighboring pixels turning ON. This will avoid the worming problem discussed earlier.

Figure 4:
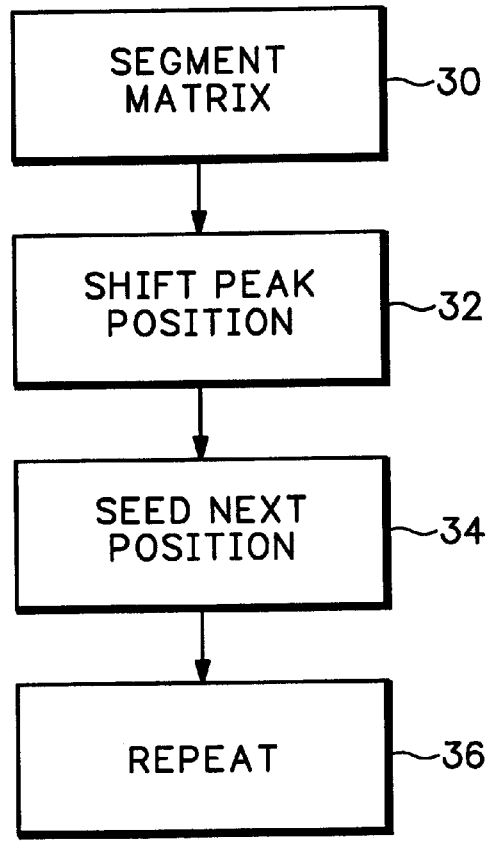
FIG. 4 is a flowchart of an automated method of enhanced error diffusion in accordance with the invention.

The peak position profiles can be placed automatically. One method for this process is shown in FIG. 4. When the positions are placed by hand, a line-like pattern may result on the output image. This is especially noticeable on lower resolution devices. Randomly placing the values can alleviate this problem, which can be achieved automatically.

Prior to starting the process, the designer needs to select an initial matrix size. For example, a matrix of 256 by 256 would be useful. Because the placement of the peak positions is more random than by hand, use of smaller matrices may result in a perceptible, repeating, square or cluster pattern in the printed image. This artifact is not necessarily objectionable, but it is not preferred. In the manual placement method, the designer can avoid this problem by selection of the peak positions. This control does not exist for the automated placement approach.

In step 30 of FIG. 4, then the process segments the matrix into squares. For the above example, the matrix will probably be segmented into 256 squares. In step 32, the position of the peak in the matrix will be shifted around. The position could be shifted using random numbers to shift it 0, 1 or 2 pixels, such as x−1, y+2. Note that the use of the centroid for the initial starting position is assumed.

Once the value of the peak position is selected and it position is determined, that position is used to 'seed' the next position. An examination process can be built in that adjusts the next position based upon its distance relative to the last peak. This is shown in step 34. This is then repeated until a predetermined number of peaks are completed.

The number of peaks depends upon the desired density of the peak position profiles. A key difference between this invention and prior filters and blue noise masks is that most of the values in the matrix are zero. This reduces the necessary computations to generate the matrices.

For the first level of peaks, for example, it is probably desirable to turn on almost all pixels, except white. As the process moves through the succeeding levels, it is more desirable to make turning on the pixels more difficult. In one embodiment, sixteen different levels are used.

Another major advantage of this approach is that the shifting of the positions of peaks between colors avoids color correlation. The starting position for each color is selected to be different from the other colors. By selecting the starting positions carefully, the system designer can ensure that the process avoids any overlap between dots of different colors.

A further refinement can be applied to this invention with relative ease. If the area is solid or white, the system just outputs an ON or OFF without using any accumulated error density. This preserves these areas without pollution from the error diffusion process. Similarly, these accumulated error densities are not pushed across these areas. The error diffusion process just begins again when the edge of either a white or solid area occurs.

Thus, although there has been described to this point a particular embodiment for a method of enhanced error diffusion, it is not intended that such specific references be considered as limitations upon the scope of this invention except in-so-far as set forth in the following claims.

What is claimed is:

1. A method for enhanced error diffusion, the method comprising:
    selecting values for a first level of peak positions;
    placing said peak positions in selected positions of a matrix, thereby creating a peak position profile;
    adjusting an error threshold by applying non-zero values from said peak position profile, producing a profiled threshold;
    calculating error using said profiled threshold;
    diffusing said error to neighboring pixel locations; and
    repeating said process for a predetermined number of levels.

2. The method as claimed in claim one wherein placing said peak positions further comprises manually placing said peak positions.

3. The method as claimed in claim one wherein placing said peak positions further comprises automatically placing said peak positions.

4. The method as claimed in claim 1 wherein said matrix further comprises a 16×16 matrix.

5. The method as claimed in claim 1 wherein said matrix further comprises a 256×256 matrix.

6. The method as claimed in claim 1 wherein the error threshold is set higher to decrease the likelihood of dots being rendered.

7. The method as claimed in claim 6 wherein said error threshold equals 195, where a value of 255 is ON and a value of 0 is OFF.

8. A method for automatically selecting placement of peak positions, the method comprising:

segmenting a peak position profile into squares;

using a random number to determine the position of a first peak position;

seeding positions for a subsequent peak position from said first peak position;

repeating said using and seeding steps until all level peaks are placed; and repeating all of said above steps for each color, wherein a starting position for each color is different from starting positions for other colors.

* * * * *